July 24, 1956
H. A. TOULMIN, JR
2,756,407
METHOD OF MEASURING DISTANCE BETWEEN AN AIRPLANE AND
A RUNWAY THAT IS VISIBLE FROM THE
AIRPLANE DURING LOW CEILING
Filed Nov. 15, 1954
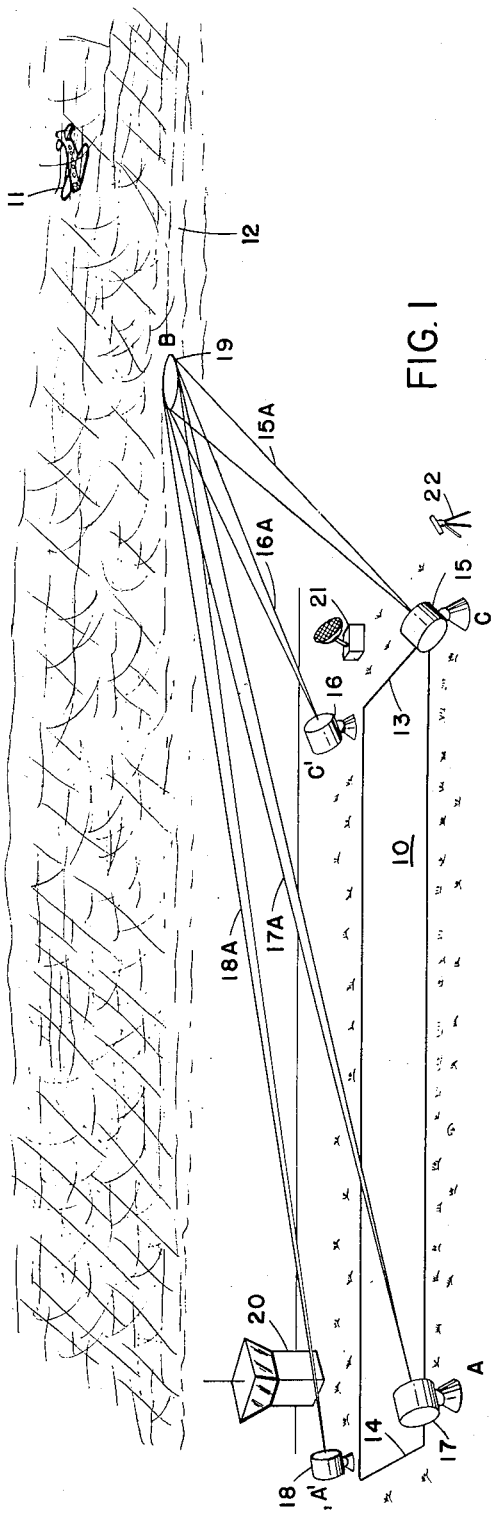
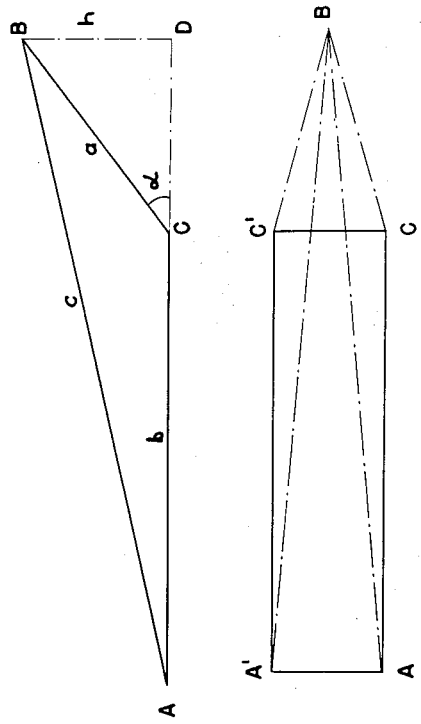
INVENTOR
HARRY A. TOULMIN, JR
BY *Toulmin & Toulmin*
ATTORNEYS United States Patent Office 2,756,407
Patented July 24, 1956

2,756,407

METHOD OF MEASURING DISTANCE BETWEEN AN AIRPLANE AND A RUNWAY THAT IS VISIBLE FROM THE AIRPLANE DURING LOW CEILING

Harry A. Toulmin, Jr., Dayton, Ohio, assignor to The Commonwealth Engineering Company of Ohio, Dayton, Ohio, a corporation of Ohio Application November 15, 1954, Serial No. 468,746

3 Claims. (Cl. 340—26)

The present invention relates to facilitating landing of aircraft when there is a low ceiling, more particularly, to a method and arrangement for determining the distance between the approach end of a runway and a point on the ceiling at which the landing aircraft should emerge.

In aviation one of the most persistent problems is to safely land aircraft under low ceiling conditions. Both civil and military aviation authorities have designed various systems to be employed in facilitating the landing of aircraft under such conditions.

A low or limited ceiling is invariably formed by low hanging clouds, fog banks, or in some regions by the presence of smog. Various devices are presently in existence for accurately determining the height of a limited ceiling. While this information is valuable, in some cases it is not sufficient. It has been found desirable to know the distance between the approach end of the runway and that point in the ceiling where the aircraft will emerge if it should continue in a straight line course to the end of the runway. The precise knowledge of this slant height is extremely valuable to the pilot in safely landing the aircraft.

Various proposals have been advanced for determining this slant height distance. All of these prior proposals have been found to be unsatisfactory for a number of reasons. Ground approach control systems which are presently in use are inadequate for determining this slant height because the beams emitted from the source invariably diverge from their source. Consequently determinations of distance utilizing this system have proven to be sufficiently inaccurate so as to preclude these measurements of having any value to the pilot of a landing aircraft.

Other past proposals for measuring this slant height distance were considered unsatisfactory as the results obtained therefrom were inaccurate, the apparatus was too elaborate and complicated in nature, or installation of the arrangement would involve unwarranted expense.

It is also desired that a satisfactory arrangement for measuring this slant height should not involve the stationing of personnel at the approach end of the runway. This qualification is set forth both in order not to expose any personnel to danger and also to eliminate the need for personnel additional to the operators stationed in the control tower.

The present invention discloses an arrangement for determining this slant height distance which embodies all of the desired characteristics but which eliminates the disadvantages as enumerated above. The present arrangement essentially comprises spot light means positioned at each end of a runway and capable of being directed upon a point on the ceiling which forms a straight line between the approach end of the runway and the position of the aircraft. By employing the triangular relationships taught in trigonometry, the desired distance may readily be calculated. Means are provided, either directly associated with the lights or positioned to one side thereof, for accurately determining the angle formed by the beams of light and the ground.

As this arrangement is extremely accurate and enables computations to be quickly made, the distance between the approach end of the runway and the point on the ceiling from which the aircraft is expected to emerge may be readily communicated to the pilot of the incoming aircraft in order to keep him accurately informed of his position. The distance of this slant height, together with the known height of the limited ceiling, will enable the pilot of the aircraft to arrive at a sound decision as to whether the aircraft may be safely landed under the existing conditions.

It is, therefore, the principal object of this invention to provide a simplified and novel arrangement to aid in the landing of aircraft when the ceiling is limited.

It is another object of this invention to provide an improved arrangement for accurately and quickly determining the distance between the approach end of a runway and a point on the ceiling.

It is a further object of this invention to provide an arrangement wherein a triangle formed by beams of light and the runway is utilized to compute the distance between the approach end of the runway and a point on the ceiling.

It is an additional object of this invention to provide an inexpensive arrangement for determining the slant height between the end of a runway and a point on the ceiling from which the landing aircraft will emerge.

It is still another object of this invention to provide an improved and novel method of determining the slant height between the approach end of a runway and a point on the ceiling at which a landing aircraft should emerge if it continues in a straight line course to the approach end of the runway.

Other objects and advantages of this invention will become apparent upon reference to the following description when taken in conjunction with the accompanying drawings wherein:

Figure 1 is a schematic view of the disclosed arrangement for computing the slant height;

Figure 2 is a side elevational view of the triangle formed by the beams of light and the runway; and Figure 3 is a top plan view of the geometric pattern formed by the spotlights as they are directed upon the point on the ceiling.

Returning now to the drawings, more particularly to Figure 1 wherein like reference symbols indicate the same parts throughout the various views, the arrangement disclosed as this invention is illustrated schematically. In this arrangement 10 indicates a runway upon which an airplane 11 flying in fog or the like indicated at 12 is to land. Runway 10 has an approach end 13 and an upper end 14. Positioned on either side of the runway at the approach end thereof are searchlights 15 and 16. A second pair of searchlights 17 and 18 are similarly positioned in respect to the upper end 14 of the runway. The searchlights 15 through 18 emit light beams 15A to 18A respectively. As shown in Figure 1, these light beams converge upon a spot 19 which is upon the lower surface of the fog 12.

A control tower 20 is located laterally of the runway 10. Control cables extend from each one of the searchlights 15 through 18 to the control tower 20. Suitable control means are provided in the control tower for individually operating the searchlights. The searchlights are of the type that may be elevated or traversed to any angle desired. A conventional searchlight which is capable of being trained in any direction may be satisfactorily used.

In addition, means is provided for each one of the control means in the tower for indicating the angle of elevation of each of the searchlights. This indicating means may comprise either a suitable syncro system or resistors calibrated to indicate the exact angle of elevation of each one of the lights.

The searchlight control means in the control tower may be such that each searchlight is operated individually. Or, if desired, a suitable electronic arrangement may be employed for operating the four searchlights simultaneously so as to keep each one of the searchlights upon a single spot on the ceiling. The spot 19 on the ceiling should be along the longitudinal center line of the runway 10. Consequently, automatic control means may be provided for training each one of the searchlights along this center line.

A suitable radar apparatus 21 is positioned at the approach end of the runway 13. This radar apparatus may be extremely simple in nature as the function of the radar is to determine the angle of elevation between the position of the aircraft and the approach end of the runway.

In some installations of this arrangement where it is not feasible to have a centralized control of the searchlights, other means may be used to determine the angles formed by the lights. In this event each one of the searchlights may be operated individually. A transit or any other suitable instrument for determining angles may be positioned as indicated at point 22. The instrument 22 is used to determine the angles with the horizontal formed by the light beams 15A and 17A. The manner in which these measurements are then employed to determine the required slant height will be presently described.

With the above described arrangement in mind, the manner in which the desired slant height is determined will now be explained. The approaching aircraft and the airport are in constant radio communication with each other. In this manner the aircraft is informed of the nature of conditions existing at the airport. The pilot of the aircraft is then told which runway he is to use for landing. With the combination of the radar apparatus 21 and the radio communication, the approaching aircraft is aligned with the runway. When the aircraft has been aligned with the runway the position of the aircraft is then determined by means of the radar apparatus 21. It is pointed out that any other apparatus may be employed for determining the position of the aircraft at this time. The aircraft is, of course, above the ceiling and the runway is not visible to it.

When the angle of the aircraft with the approach end of the runway has been determined, searchlights 15 and 16 are then trained in the direction of the aircraft. In effect, the angle of elevation of lights 15 and 16 is made to correspond with the angle of elevation indicated by the radar apparatus 21. As a result thereof, the light beams 15A and 16A will converge upon spot 19. This will result because of the fact that the searchlights are directed to converge on a spot in line with the center line of the runway.

Next, searchlights 17 and 18 are so directed that their beams 17A and 18A respectively are also trained upon the spot 19. The result will be as illustrated in Figure 1.

Viewed from a position laterally of the runway, the result will be the triangle A—B—C illustrated in Figure 2, with the points A and C corresponding with the searchlights 17 and 15 respectively, and point B corresponding with the spot 19. The height of the ceiling is designated "$h$" and "$a$" the slant height between the approach end of the runway and the point in the ceiling at which the airplane is expected to emerge.

In order to determine the length of "$a$", basic relationships between the sides and angles of an obtuse triangle are employed.

The angles A and $\alpha$, and the length of the runway as indicated at "$b$" are all known quantities. The ceiling $h$ may be determined by the following formula:

$$h = b \frac{\sin A \sin \alpha}{\sin (\alpha - A)}$$

Through this determination of $h$, the angle $\alpha$ and the side opposite thereof of the right angle triangle B—C—D are known. Therefore, the following relationship exists:

$$\sin \alpha = \frac{H}{a}$$

$$a = \frac{h}{\sin \alpha}$$

Substituting the quantity of $h$ as determined by the above formula, we have the following relationship:

$$a = \frac{b \frac{\sin A \sin \alpha}{\sin (\alpha - A)}}{\sin B}$$

At most airports, however, apparatus is usually available by which the height of the ceiling, or $h$, may be determined. In this event if $h$ is known and the angle $\alpha$ is readily determined by measuring the elevation of searchlight 15, the slant height or $a$ may be computed by employing the following formula:

$$a = \frac{h}{\sin \alpha}$$

In order that the necessary computations may be speedily made and transmitted to the pilot of the incoming aircraft, it is preferable that a computer be employed. Such a computer would be similar in nature to the computers used in aiming big guns. Various data representing the angles of the light beams with the horizontal and the length of the runway are continuously fed into the computer as the angles change. Therefore, the slant height distance will be readily available for transmission to the pilot.

It is necessary that these computations be made as rapidly as possible in view of the fact that the lower face of a fog bank is seldom flat. As the clouds are propelled by the wind, the ceiling is constantly changing. Therefore, it will be necessary to constantly adjust the elevation of the searchlights 17 and 18. The elevation of the lights 15 and 16 will be substantially constant as they are trained in the direction of the aircraft at all times. Therefore, as the angle A varies due to the changes in the height of the ceiling, the data representing A must be constantly fed to the computer.

If it is not feasible to employ a computer, the slant height may be calculated by resorting to previously prepared trigonometric tables. The angles A and $\alpha$ may be measured either by protractor devices attached to the respective searchlights or by means of the surveyor's instruments located at 22. Knowing these angles and the distance of the runway $b$, reference may be made to previously prepared tables in order to determine the slant height $a$. This distance is then transmitted to the pilot of the aircraft.

It should be borne in mind that various forms of equipment may be employed in order to obtain the many relationships referred to above. However, regardless of whatever equipment is ultimately employed, the method of determining the required slant heights will remain the same. By employing this method of forming a visible triangle, the distance between the approach end of the runway and a spot on the ceiling may be quickly and accurately determined. This additional information will enable the pilots to more safely determine whether it is feasible to attempt to land an aircraft under the existing conditions.

It is pointed out that all of the equipment employed in this arrangement is conventional and may be readily obtained. Consequently, it is unnecessary to specially design any apparatus for use in this arrangement.

It will be understood that this invention is susceptible to modification in order to adapt it to different usages and conditions, and, accordingly, it is desired to comprehend such modifications within this invention as may fall within the scope of the appended claims.

What is claimed is:

1. The method of determining the slant height between the end of a runway and a point on the ceiling comprising positioning spotlight means at the approach and upper ends of a runway, determining the angle of the position of an aircraft above the ceiling and the approach end of the runway, training the spotlight at the approach end of the runway in the direction of the position of the aircraft to form a spot of light on the ceiling, and training the spotlight means at the upper end of the runway on the spot of light whereby the relationship of the angles formed by the light beams with the ground and the distance of the runway is determinative of the slant height between the approach end of the runway and the point on the ceiling.

2. In an arrangement for determining the slant height between the approach end of a runway and a point on the ceiling at which a landing aircraft should emerge, a runway of known distance, spotlight means at both the approach and upper ends of said runway, means for directing all of the beams of said light means on a predetermined point of emergence of the aircraft through the ceiling whereby measuring the angles of said light beams with the ground in connection with the length of the runway is indicative of the slant height between the approach end of the runway and the point on the ceiling.

3. In an arrangement for determining the slant height between the approach end of a runway and a point on the ceiling at which a landing aircraft should emerge, a runway, spotlight means at the approach end of said runway, additional spotlight means along said runway spaced an appreciable distance from the light means at the approach end of the runway, means for directing all of the beams of said light means at a predetermined point of emergence of the aircraft through the ceiling whereby measuring the angles of said light beams with the ground in connection with the runway distance between said light means is indicative of the slant height between the approach end of the runway and the predetermined point on the ceiling.

References Cited in the file of this patent

UNITED STATES PATENTS

| Re. 21,838 | Buckley | June 24, 1941 |
| 1,901,880 | Shuster | Mar. 21, 1933 |
| 2,365,580 | Murcek | Dec. 19, 1944 |

FOREIGN PATENTS

| 137,445 | Great Britain | Jan. 15, 1920 |